Patented Oct. 14, 1930

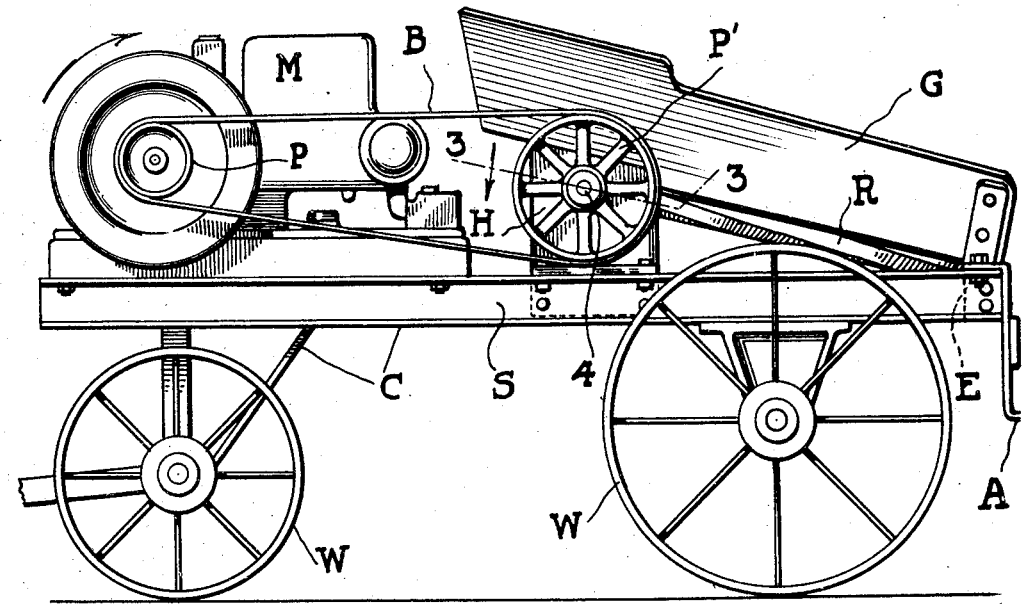
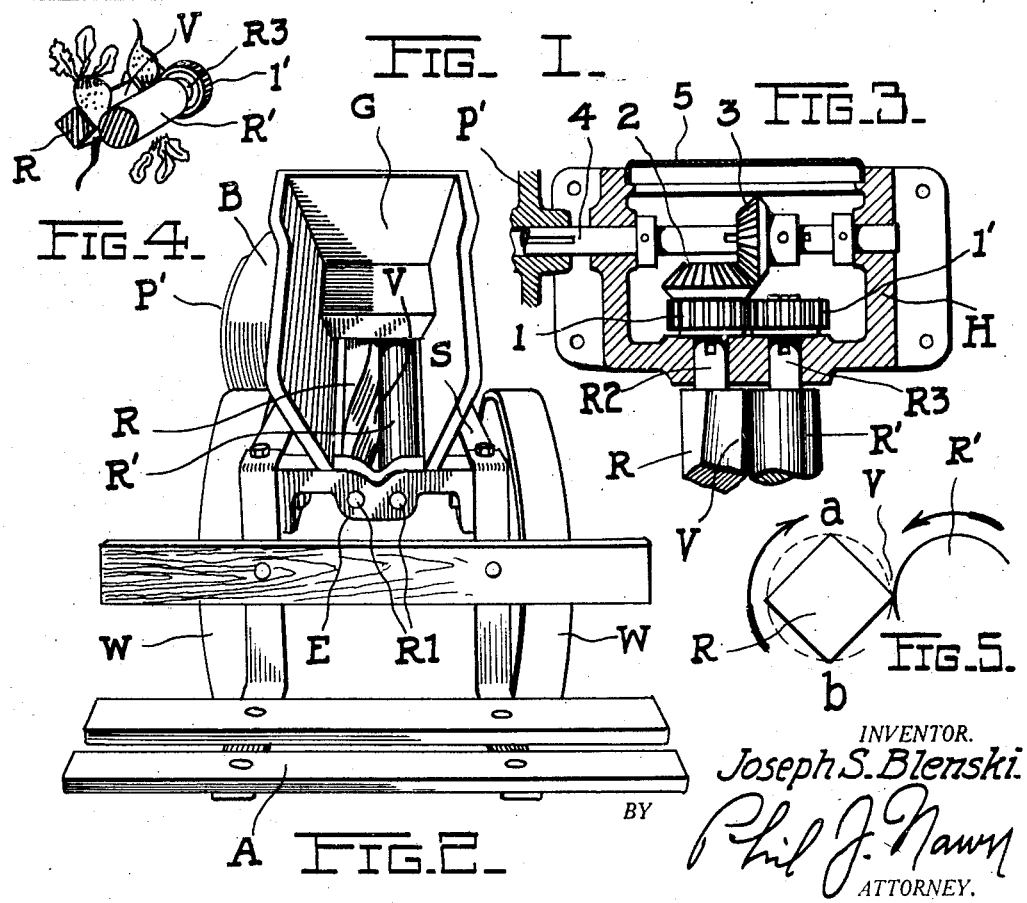

1,778,023

UNITED STATES PATENT OFFICE

JOSEPH S. BLENSKI, OF MILWAUKEE, WISCONSIN, ASSIGNOR TO DEPENDABLE HARVESTER CORPORATION, OF MILWAUKEE, WISCONSIN

HARVESTING MACHINE

Application filed July 15, 1929. Serial No. 378,430.

This invention relates to those harvesting machines which trim the products dumped into them, removing the excess leaves, roots, and non-essential growths for making them more presentable as marketable produce, or, as product to be further treated as in pickling works and canneries.

The objects of the invention, are:—The providing of a portable machine that may be easily shifted to the varying positions necessary in its intended servicing of the harvesting crews in the field where a device of this kind is employed. The providing of a suitable machine into which may be dumped the products taken from the soil so that these products will be trimmed and directed to other containers used in conveying them from the harvest field. The providing of a device light enough to be manually directed about the field of operations wherein the machine is being employed, and constructed in such a manner that the device may be easily shipped to distant points within containers of minimum volume for economizing in the costs attending the shipment of freight of this classification. The providing of a power unit adjacent the operative means the said power unit actuates, for allowing a short belt to connect up the said source of power, which condition takes advantage of the action common to short looped belts, the feature of slipping their pulleys, and the advantage of easy replacement again of the displaced belt. This advantage is of great value when obstructions get between rotating parts unknown to those operating the machine. The arranging of a grease tight chamber for a major gear assembly. And, the pairing of a twisted rectangular bar to offer its corners as a member that coincides with a parallel cylindrical bar to provide a pinching action which nips off certain undesirable features of the products harvested.

Other advantages will be noted throughout the specification and particularly pointed out in the appended claim; reference being had to the accompanying drawing, the several views of the latter being indexed as follows:—

Figure 1 is a side elevation of the machine.

Figure 2 is a view looking at the discharge end.

Figure 3 is a section on line 3—3 of Fig. 1.

Figure 4 is a fragmentary view with harvested products shown between the rolls.

Figure 5 is a transverse view of the nipping rolls.

Similar characters of reference apply to like parts throughout the several views.

A framework or chassis C, comprises channel iron side members S that are held in spaced relation by a motor unit M, a gear housing H, and an end casting E. These elements along with suitable wheels W, mounted upon a fixed rear axle and a swingable front axle complete the portable assembly which is easily maneuvered manually about the field of operations, and, of course, there is the usual provisions whereby the device may be readily transported to distantly removed locations with the aid of any suitable draft means.

The housing H and the end casting E have supporting planes upon which is carried a hopper-chute G that is inclined to induce products dumped therein to travel towards the discharge end whereat is attached an apron A that holds whatever containers appropriate for receiving the produce being harvested. The chute G is open at its bottom, between the housing H and the casting E, except for a pair of oppositely rotating rolls, which partially close the said bottom, the aforesaid rolls offer a twisted rectangular member R, and a plain cylindrical member R'.

The rectangular roll R is given a half turn, that is, a corner "$a$", at the housing H will be the corner "$b$" at the casting E, see Fig. 5. The rolls rotate at uniform speeds, and the elongated spiral edge offered by the corners of the rectangular member R, gathers the tail like roots and the leaves into a swiftly moving wedge-shaped valley V where the oncoming spiral edge pinches them against the roll R', which action nips them off and carries the refuse beneath where it falls to the ground, and, at the same time compels the desirable portions of the harvest to find the containers at the discharge end.

The rolls R and R' are reduced at their ends to provide axial trunnions, RI at the casting E, and R²—R³ at the housing H. Suitable bores in the casting E function as journals for the trunnion studs R¹, and a similar provision obtains at the housing H for the trunnions R² and R³. In the case of the latter trunnions each will have keyed thereon similar spur pinions I' and I, meshed together for rotation as per arrows shown. The trunnion R² is extended to accommodate a mitre gear 2 that is in mesh with a similar gear 3 keyed to a drive shaft 4 which latter is journalled in the side walls of the housing H; this shaft projects beyond the housing to receive a drive pulley P' that is geared to an engine pulley P by means of a short belt loop B. The object of the short belt is to allow the said belt to readily slip off the pulley P' whenever any obstruction gets between the rolls whose spaced relation is fixed, the said obstruction locking the rolls against rotation, causing the belt to creep off either pulley, generally, the pulley P'; this occurrence is easily cared for as the replacing of the belt B is a simple matter, and the provision eliminates any possibility of damage to either the rolls, the gearing, or the motor M.

The housing H is provided with a cover plate 5 which completes a dust-proof chamber wherein is confined the principal frictional assembly, and this assembly is arranged to run in grease. The said housing, being of box-like design, lends itself to the simpler forms of shop fixtures for machining same accurately and rapidly, both in the matter of its employment as a spacer-support, and, as a multiple bearing element for the shaft 4 and the roll trunnions R² and R³. With this element in position the assembling of the remainder of the machine is an easy performance that can be accomplished by labor of the mediocre type.

The machine is composed of simple elements arranged with a view to obviating the outlays occurring through costly service fees that obtain where the devices are complex in structure and require more than the ordinary skill abounding in the localities where devices of this classification are in demand. The unusual feature of this device is the twisted roll R. This roll is made from square bar stock that has been produced in the customary steel-rolling method, hence the corners are true and correctly fashioned; these corners remain straight throughout the process of twisting the bar, so that no costly machining of an irregular element, such as this member is, is necessary in the present instance. The roll R is not regarded as a replacement consideration.

The drawings are purposely close to the "diagrammatic"; many refinements common to the construction of mechanical assemblies are not shown, but applicant wishes it understood that he may infer same to be here incorporated in so far as there is no departure from the spirit of the invention above disclosed.

Having described the invention, what is claimed to be patentably novel, and desirous of protecting by Letters Patent, is:—

A harvesting machine having, a rectangular roll twisted to offer spiral ridges thereon, a cylindrical roll opposely rotated to contact with said ridges, the aforesaid ridges spirally elongated to described one half of a circle that incloses the cross-sectional area of the said rectangular roll.

In testimony of which I hereunto affix my signature.

JOSEPH S. BLENSKI.